(12) United States Patent
Wenzler

(10) Patent No.: US 7,340,345 B2
(45) Date of Patent: Mar. 4, 2008

(54) METHOD AND CIRCUIT ARRANGEMENT FOR DETERMINING A QUALITY LEVEL OF PHASE SIGNALS

(75) Inventor: Axel Wenzler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 10/542,505

(22) PCT Filed: Jul. 28, 2004

(86) PCT No.: PCT/DE2004/001689

§ 371 (c)(1),
(2), (4) Date: Jul. 15, 2005

(87) PCT Pub. No.: WO2005/043086

PCT Pub. Date: May 12, 2005

(65) Prior Publication Data

US 2006/0116822 A1    Jun. 1, 2006

(30) Foreign Application Priority Data

Oct. 1, 2003   (DE) ............................... 103 45 729

(51) Int. Cl.
G06F 19/00   (2006.01)
G01L 3/00    (2006.01)

(52) U.S. Cl. .................................... 702/1; 73/862.326
(58) Field of Classification Search .............. 702/1, 702/94, 150, 151; 324/207.24, 207.25; 73/1.75, 73/862.326, 862.08
See application file for complete search history.

(56) References Cited

U.S. PATENT DOCUMENTS

| | | | | |
|---|---|---|---|---|
| 4,590,806 A | * | 5/1986 | Lutton et al. | 73/862.327 |
| 4,874,053 A | * | 10/1989 | Kimura et al. | 180/443 |
| 5,438,882 A | * | 8/1995 | Karim-Panahi et al. | 73/862.324 |
| 5,930,905 A | | 8/1999 | Zabler et al. | 33/1 PT |
| 6,304,076 B1 | * | 10/2001 | Madni et al. | 324/207.17 |
| 6,401,052 B1 | | 6/2002 | Herb et al. | 702/150 |
| 6,418,388 B1 | | 7/2002 | Dietmayer | 702/95 |
| 6,520,031 B2 | * | 2/2003 | Madni et al. | 73/862.326 |
| 6,816,108 B2 | * | 11/2004 | Steinlechner et al. | 342/118 |

(Continued)

FOREIGN PATENT DOCUMENTS

DE   195 06 938   6/1996

(Continued)

*Primary Examiner*—John Barlow
*Assistant Examiner*—Toan M. Le
(74) *Attorney, Agent, or Firm*—Michael J. Striker

(57) ABSTRACT

The present invention relates to a method and a circuit arrangement for evaluating phase signals for determining an angle or a path of a linearly or rotationally displaced component, whereby a number (N) of measured phase values ($\underline{\alpha}$), produced by scanning at least one phase sensor arrangement on the linearly or rotatably displaced component by means of an assigned sensor, are evaluated. According to the invention, once the measured phase values ($\alpha$) have been transformed with a matrix ($\underline{M}_1$), a quality level (R) is determined by producing a vector (T) followed by the result of a quantization operation ($\underline{V}$) regarding the vector ($\underline{T}$). Once a transformation has been carried out with a further matrix ($\underline{M}_4$), a further vector ($\underline{X}$) is produced from the difference ($\underline{t}$) between the vector ($\underline{T}$) and the result of the quantization operation ($\underline{V}$), coefficients ($C_j$) and ($D_j$) being applied to the components ($x_j$) of said other vector, and the quality level (R) is derived therefrom.

5 Claims, 1 Drawing Sheet

U.S. PATENT DOCUMENTS

| | | | |
|---|---|---|---|
| 2004/0080451 A1 | 4/2004 | Steinlechner et al. | 342/127 |
| 2005/0073298 A1 | 4/2005 | Strasser | 324/207.23 |

FOREIGN PATENT DOCUMENTS

| | | |
|---|---|---|
| DE | 199 15 968 | 10/2000 |
| DE | 199 34 733 | 2/2001 |
| DE | 100 18 298 A1 | 10/2001 |
| DE | 101 42 448 | 3/2002 |
| DE | 101 42 449 | 3/2002 |

* cited by examiner

METHOD AND CIRCUIT ARRANGEMENT FOR DETERMINING A QUALITY LEVEL OF PHASE SIGNALS

CROSS-REFERENCE

The invention described and claimed hereinbelow is also described in PCT/DE 2004/001689, filed Jul. 28, 2004 and DE 103 45 729.1, filed Oct. 1, 2003. This German Patent Application, whose subject matter is incorporated here by reference, provides the basis for a claim of priority of invention under 35 U.S.C. 119 (a)-(d).

BACKGROUND OF THE INVENTION

The present invention relates to a method and a circuit arrangement for determining a quality level of phase signals, in particular in the detection of a motion or an angle of rotation or a torque on axes or shafts.

For example, to detect the torque acting on a steering wheel axis of a motor vehicle while the steering wheel rotates, very small angular changes must be measured in both directions of rotation of the steering wheel. It is possible to use incremental angle sensors in this case that assign a measured phase value to an angular position based on the evaluation of signals that are optical, magnetic or that are produced in any other way, e.g., by the rotation, and that are detected using suitable means. To increase the unambiguous range, it is possible to look at a further measurement channel with a different phase slope. A plurality of measured phase values is therefore obtained in this case, from which the quantity to be measured, such as the angle of rotation, an angular difference or the distance from a target, is to be determined.

When more than two phase signals are involved, a method described in publication DE 101 42 449 A1, for example, is used to evaluate measured phase values of this type. In that method, a highly exact, robust and unambiguous measured phase or angle value is produced from a number N of multivalued, disturbed phase signals. To accomplish this, the measured phase values are mathematically transformed using a linear transformation method, among other things, and evaluated with a specified weighting.

The method is used, e.g., with an optical angle sensor, in the case of which N parallel tracks are created on a cylinder. Located on each of the N tracks (i=1 . . . N) are $n_i$ periods of a phase information that, in the optical case, for example, is represented by $n_i$ periods of light-dark transitions. Other sensor principles, e.g., magnetic or capacitive, are also possible in this case. The tracks of the sensor can also be created on a plane instead of a cylinder, e.g., in the case of a path sensor.

It is also known, from publication DE 195 06 938 A1, that the phase signals can be evaluated via the single or multiple application of a classical or modified vernier principle.

To determine an angular difference, it is furthermore also known from publication DE 101 42 448 A1 that the measured phase values are summed in a weighted manner and, from this sum, the whole-number portion and the non-whole number portion are determined. The non-whole number portion is proportional to the angular difference between two groups of tracks of an incremental-value indicator on a shaft. The torque acting on the shaft can therefore be determined via multiplication with the spring rate of a torsion bar installed between the groups of tracks.

It is also known per se from publication DE 100 34 733 A1 that a specified offset value is added to the measured phase value in an initialization phase and, in turn, as a result, the offset value is compensated. An iterative approximation method carried out to perform offset compensation of two orthogonal sensor signals is also known per se from publication DE 199 15 968 A1.

The method according to the general class can be used, for example, with a corresponding sensor arrangement—as described in publication DE 101 42 448 A1 above—on the steering shaft of a vehicle as a "torque angle sensor" (TAS) that simultaneously transmits the steering angle and steering torque.

SUMMARY OF THE INVENTION

With the method according to the general class mentioned initially for detecting the angle of rotation and/or the torque on rotating mechanical components, measured phase values can be evaluated by scanning at least one phase sensor on the rotating component using a sensor assigned to it. According to the present invention, a determination of the quality of the phase signals is advantageously carried out in this manner: once the measured phase values have been transformed with a specified matrix, a vector and the result of a quantization operation regarding the vector are produced. Subsequently, once a transformation has been carried out with a further matrix, a further vector is produced from the difference between the vector and the result of the quantization operation. The absolute value of the minimum is calculated based on the components of the other vector, and the quality level is derived therefrom. The quality level can be determined in a particularly advantageous manner according to the following relationship:

$$R \cdot e_{max} = \min_{j=1 \ldots nx} \lfloor |D_j \pm x_j \cdot C_j| \rfloor,$$

whereby the variables $C_j$ and $D_j$ are coefficients that are derivable from the phase signals. Application of coefficients $C_j$ and $D_j$, and the transformation of the vector with the further matrix can also be easily combined into one method step.

The method according to the present invention can be realized in an advantageous manner with a circuit arrangement composed of an electronic circuit and that includes a linear mapping module for processing the phase signals, and a quantization module. Using a further linear mapping module, the other vector can be produced from the difference of the vector at the output of the first linear mapping module and the result of the quantization operation at the output of the quantization module, it being possible to apply the coefficients to said other vector in further modules.

With the method according to the present invention and the circuit arrangement, it is therefore possible, in an advantageous manner, to determine a scalar level of quality for evaluating the interrelationship between the individual measured phase values. With the aid of this level, it is then possible to detect interferences and erroneous measurements by the sensor system. The present invention therefore makes it possible to monitor the sensor system in entirety, since it has not been previously possible to evaluate the entire system in this manner. For example, if the position of the sensor head is slanted relative to the sensor tracks due to a "tilt angle", the level of quality is reduced considerably. The present invention furthermore describes a method and a circuit arrangement for determining the level of quality with a small outlay for software and/or hardware in an electronic circuit, since the calculation of the absolute angular values is initially not required to calculate the level of quality.

BRIEF DESCRIPTION OF THE DRAWINGS

An exemplary embodiment of a circuit arrangement for carrying out the method according to the present invention is explained with reference to the drawing.

DETAILED DESCRIPTION OF THE EMBODIMENT

Figure 1:
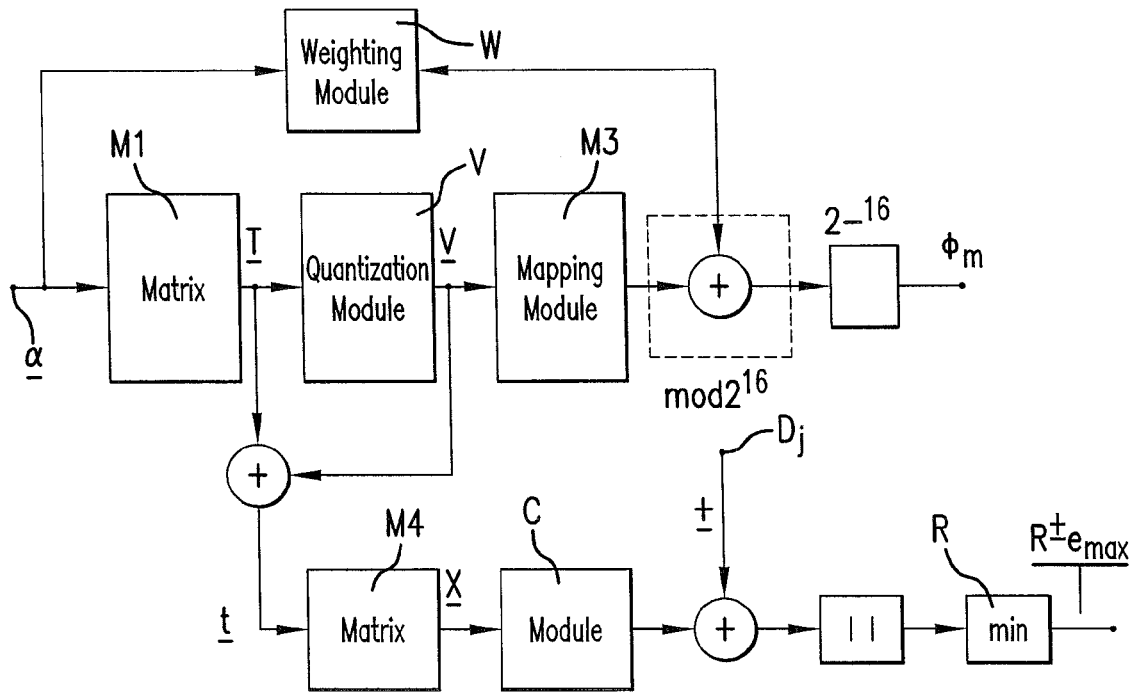
FIG. 1 shows a schematic view of a circuit arrangement for detecting the angle of rotation of an axis or shaft by evaluating phase signals, and the arrangement for determining the level of quality.

FIG. 1 shows a block diagram of a circuit arrangement for detecting the angle of rotation of an axis or shaft by evaluating phase signals $\underline{\alpha}$, which are measured on an axis of a rotating component, for example, the angle of rotation $\Phi$ and angular difference of which are determinable by using an appropriate sensor arrangement. An arrangement of this type is known in principle from the publication DE 101 42 448 A1 mentioned as the related art in the introduction to the description, above. It is known from publication DE 101 42 449 A1, which is also mentioned in the introduction to the description, that the following equation applies for phase signals $\alpha_i$ in the case of an angle sensor with N phase signals:

$$\begin{pmatrix} a_1 \\ a_2 \\ a_3 \\ a_N \end{pmatrix} = \operatorname*{mod}_{2\pi} \left[ \Phi \cdot \begin{pmatrix} n_1 \\ n_2 \\ n_3 \\ n_N \end{pmatrix} \right] \qquad (1)$$

The quantity $\Phi$ in this case is the absolute angle being searched for in the measurement task, whereby the same relationships also apply for a linear path sensor. Ideal measured values are a prerequisite in this case, i.e., there are basically no measurement errors. The description of the method according to the present invention is then carried out based on a four-dimensional phase evaluation (N=4) of the signals from optical signal sensors. From this, the angular position $\Phi_m$ and, if applicable, the torque of the shaft or axis, can be determined using the further modules.

Shown in detail in FIG. 1 is a linear mapping module M1 for transforming the phase signals $\underline{\alpha}$ using a matrix $\underline{M}_1$ into a vector $\underline{T}$, and a quantization module V for producing a quantization operation $\underline{V}$. Following this is a further linear mapping module M3 for performing a transformation with a matrix $\underline{M}_3$, followed by an operation—which is also known from the related art—with a mod $2^{16}$ module with consideration for the output signal of a weighting module W for phase signals a around angular position $\Phi$.

The starting point for calculating the level of quality R according to the present invention are the phase values themselves or a determination according to equation (2) below from the difference $\underline{t}$ between vectors $\underline{T}$ and $\underline{V}$, which are available, in principle, as intermediate values of the multidimensional phase evaluation according to the related art DE 101 42 449 A1 with the circuit arrangements that are common here.

$$\underline{t} = \underline{T} - \underline{V} = \underline{T} - \text{quant}(\underline{T}) \qquad (2)$$

This N−1 dimensional difference $\underline{t}$ is depicted in a vector $\underline{X}$ with the aid of a matrix M4 according to FIG. 1 in a linear mapping module M4:

$$\underline{X} = \underline{M}_4 \cdot \underline{t} \qquad (3)$$

Matrix M4 is composed of $$n_x = \binom{N}{N-2} = \frac{N!}{2 \cdot (N-2)!} \qquad (4)$$

rows. The components $x_j$ of vector $\underline{X}$ are subsequently multiplied by coefficients $C_j$ in a module C. A further $n_x$ coefficients $D_j$ are then added or subtracted to or from the result. Using the $2n_x$ values obtained in this manner, the absolute value of the minimum is subsequently calculated in a module R. This minimum has the value $$R \cdot e_{max} = \min_{j=1 \ldots nx} \lfloor |D_j \pm x_j \cdot C_j| \rfloor \qquad (5)$$

The value $e_{max}$ is the error that is permissible simultaneously in all N phase values; $e_{max}$ depends on the dimension and the special selection of period numbers $n_j$. The calculation steps for the quantities mentioned above are shown, in principle, in the signal flow chart in FIG. 1 for N=4 dimensions, for example.

The circuit arrangement for other dimensions N is basically identical, and only the stated number of signal lines changes.

Based on a number with N=3 phase signals as an example, the following values are assumed, for instance: $n_1=3$, $n_2=4$, and $n_3=5$. The values from equation (2) are used as the starting point. In this case, matrices $\underline{M}_1$ and $\underline{M}_4$ are:

$$\underline{M}_1 = \begin{pmatrix} 1 & -2 & 1 \\ -1 & -1 & 2 \end{pmatrix} \quad \underline{M}_4 = \begin{pmatrix} -2 & 1 \\ -1 & 2 \\ 2 & 1 \end{pmatrix}$$

and coefficients $C_j$ and $D_j$, each with j=1 . . . 3, then have the values:

$$C_1 = \frac{1}{7}, C_2 = \frac{1}{8}, C_3 = \frac{1}{9}, D_1 = \frac{1}{7}, D_2 = \frac{1}{8}, D_3 = \frac{1}{6}$$

For ideal phase signals according to equation (1), R=1 and $$R \cdot e_{max} = 45°$$

apply. If all phase signals $\alpha_i$ are shifted by 180° as an inverse pattern, a level of quality of R=0 results.

Figure 2:
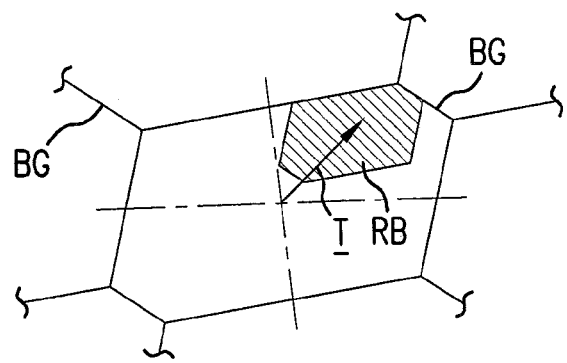
FIG. 2 shows a depiction of the phase signals after a transformation and quantization in a two-dimensional space.

The level of quality R calculated with the methods described above indicates how much noise or which measurement error, starting with the current measured phase value, can still be permitted while guaranteeing the desired level of functionality. An example with N=3 dimensions is shown in FIG. 2. In this example, after a transformation into a two-dimensional t-space, the range limits BG for the measured phase values in the t space are shown as vectors t. The possible locations of the noise for a correct result are enclosed in the area RB.

In this case, the noise is typically based on the value $e_{max}$. This means that, given ideal phase values according to relationship (1), R=1 applies and the current measured value is therefore located in the starting point of vector t. If the current measured value is located exactly on an area limit BG of quantization unit V according to FIG. 1, the level of quality R assumes its minimum value R=0.

What is claimed is:

1. A method for evaluating phase signals for determining an angle or a path of a linearly or rotationally displaced component, the method comprising:

scanning a number (N) of measured phase values ($\Delta$) at at least one phase sensor arranged on the linearly or rotationally displaced component;

transforming mathematically the measured phase values ($\Delta$) into a new range using a linear transformation with a matrix ($M_1$);

determining a quality level (R) by producing a vector (T) followed by the result of a quantization operation (V) regarding the vector (T);

producing a further vector (X) from the difference (t) between the vector (T) and the result of the quantization operation (V) after a transformation has been carried out with a further matrix ($M_4$);

calculating a minimum value from the components ($x_j$) of the further vector (X) to derive the quality level (R); and evaluating the phase signals and determining the angle or path of the linearly or rotationally displaced component based on the value of the quality level (R).

2. The method as recited in claim 1, wherein the quality level (R) is determined based on the following relationship:

$$R \cdot e_{max} = \min_{j=1 \ldots nx} \{|D_j|\gamma_{x_j}C_j|, \{|D_j|Y_{x_j}C_j|\}\}$$

whereby the quantities ($C_j$) and ($D_j$) are coefficients that are derivable from the phase signals.

3. The method as recited in claim 2, wherein the application of the coefficients ($C_j$) and ($D_j$) and the transformation of the vector (X) with the further matrix ($M_4$) are combined in one method step.

4. An arrangement for carrying out the steps of the method as recited in claim 1.

5. An arrangement for carrying out the steps or the method as recited in claim 1, comprising:

an electronic circuit provided with a linear mapping module ($M_1$) for processing the phase signals ($\Delta$) with a matrix ($M_1$), and with a quantization module (V), and wherein with a linear mapping module (M4), it is possible to produce the other vector (X) from the difference (t) of the vector (T) at the output of the linear mapping module (M1) and the result of the quantization operation (V) at the output of the quantization module (V), it being possible to apply the coefficients ($C_j$) and ($D_j$) to said other vector in further modules (C, D).

* * * * *